US011706671B2

(12) United States Patent
Park et al.

(10) Patent No.: US 11,706,671 B2
(45) Date of Patent: Jul. 18, 2023

(54) METHOD AND APPARATUS FOR CONDITIONAL HANDOVER OPERATION IN COMMUNICATION SYSTEM

(71) Applicant: ELECTRONICS AND TELECOMMUNICATIONS RESEARCH INSTITUTE, Daejeon (KR)

(72) Inventors: Hyun Seo Park, Daejeon (KR); Yun Joo Kim, Daejeon (KR); Eunkyung Kim, Daejeon (KR); Tae Joong Kim, Daejeon (KR); An Seok Lee, Daejeon (KR); Yu Ro Lee, Daejeon (KR); Heesoo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 29 days.

(21) Appl. No.: 17/338,575

(22) Filed: Jun. 3, 2021

(65) Prior Publication Data
US 2021/0385703 A1 Dec. 9, 2021

(30) Foreign Application Priority Data

Jun. 4, 2020 (KR) .................. 10-2020-0067406
May 31, 2021 (KR) .................. 10-2021-0069770

(51) Int. Cl.
*H04W 36/00* (2009.01)
(52) U.S. Cl.
CPC ... *H04W 36/0061* (2013.01); *H04W 36/0083* (2013.01)

(58) Field of Classification Search
CPC ......... H04W 36/0061; H04W 36/0083; H04W 36/00835; H04W 36/36
See application file for complete search history.

(56) References Cited

U.S. PATENT DOCUMENTS

| 9,521,605 | B2 | 12/2016 | Oh et al. |
| 9,832,806 | B2 | 11/2017 | Lee et al. |
| 10,362,519 | B2 | 7/2019 | Dai et al. |
| 2019/0037454 | A1 | 1/2019 | Lee et al. |
| 2019/0289505 | A1 | 9/2019 | Thomas et al. |
| 2020/0022042 | A1 | 1/2020 | Yin |
| 2020/0153500 | A1 | 5/2020 | Kim et al. |
| 2020/0267604 | A1 | 8/2020 | Hwang et al. |
| 2022/0240140 | A1* | 7/2022 | Wu ............ H04W 36/08 |

* cited by examiner

*Primary Examiner* — Marisol Figueroa
(74) *Attorney, Agent, or Firm* — Rabin & Berdo, P.C.

(57) ABSTRACT

Disclosed are a method and an apparatus for enhanced conditional handover (CHO). An operation method of a base station may comprise: receiving a measurement report message from a terminal; transmitting a CHO request message to one or more candidate target cells; receiving a CHO request ACK message from the one or more candidate target cells; and transmitting an RRC reconfiguration message including CHO status report configuration information to the terminal, wherein the CHO status report configuration information requests transmission of information for determining a target cell to which terminal is likely to be handed over among the one or more candidate target cells.

19 Claims, 7 Drawing Sheets

METHOD AND APPARATUS FOR CONDITIONAL HANDOVER OPERATION IN COMMUNICATION SYSTEM

CROSS-REFERENCE TO RELATED APPLICATIONS

This application claims priority to Korean Patent Applications No. 10-2020-0067406 filed on Jun. 4, 2020 and No. 10-2021-0069770 filed on May 31, 2021 with the Korean Intellectual Property Office (KIPO), the entire contents of which are hereby incorporated by reference.

BACKGROUND

1. Technical Field

The present disclosure relates to a technique for conditional handover, and more specifically, to a technique of controlling radio resources of a mobile communication terminal for efficient conditional handover.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The 5G communication system (hereinafter, new radio (NR) communication system) using a higher frequency band (e.g., a frequency band of 6 GHz or above) than a frequency band (e.g., a frequency band of 6 GHz or below) of the 4G communication system (e.g., long term evolution (LTE) communication system) is being considered for processing of wireless data soaring after commercialization of the 4G communication system. The 5G communication system may support enhanced Mobile BroadBand (eMBB), Ultra-Reliable and Low Latency Communication (URLLC), and Massive Machine Type Communication (mMTC).

Meanwhile, in the communication system, a terminal may change a cell (e.g., base station) to which the terminal is connected through a handover procedure or a cell (re)selection procedure. In the handover procedure, the terminal may measure a strength of a signal received from a neighbor base station, and may report a measurement result to a source base station. The source base station may receive the measurement result from the terminal, and may select a target base station to which the terminal is to be handed over based on the measurement result. That is, the target cell to which the terminal is to be handed over may be selected by the source cell. When handover preparation is completed in the target cell selected by the source cell, the source cell may transmit a handover (HO) command message indicating handover to the target cell to the terminal. When the HO command message is received from the source cell, the terminal may perform an access procedure with the target cell.

A conditional handover technique has been introduced to reduce a handover failure probability of handover in the LTE and NR systems. In the conditional handover, a source cell prepares a target cell in advance, and the terminal may not perform handover immediately after receiving the handover command message, and when a signal strength of the target cell satisfies a certain condition, the terminal may be handed over to the target cell. In the conditional handover, in order to reduce a handover failure probability, a handover preparation operation may be performed in a plurality of candidate target cells prior to an actual handover execution time. Therefore, resources reserved in the candidate target cells to which the terminal is not actually to be handed over may be wasted unnecessarily, resulting in a problem of deteriorating system resource efficiency.

In addition, when data to be transmitted to the terminal is forwarded in advance from the source cell to the plurality of candidate target cells in order to reduce a handover interruption time, the data forwarded in advance to the candidate target cells to which the terminal will not be actually handed over may be discarded unnecessarily. Also, the data forwarded to the target cell to which the terminal is actually to be handed over may be data that the terminal has already received from the source cell. In this case, since the data stored in the target cell (i.e., data forwarded to the target cell) is unnecessary data, it may be deleted. For such the unnecessary data forwarding, hardware resources of the base station and capacity of interface links between the base stations may be wasted.

SUMMARY

In order to solve the above-identified problems, exemplary embodiments of the present disclosure are directed to providing a method and an apparatus for conditional handover enhanced for efficiently managing system resources and minimizing a handover interruption time.

According to an exemplary embodiment of the present disclosure for achieving the above-described objective, an operation method of a base station may comprise: receiving a measurement report message from a terminal; transmitting a conditional handover (CHO) request message to one or more candidate target cells; receiving a CHO request acknowledgement (ACK) message from the one or more candidate target cells; and transmitting a radio resource control (RRC) reconfiguration message including CHO status report configuration information to the terminal, wherein the CHO status report configuration information requests transmission of information for determining a target cell to which terminal is likely to be handed over among the one or more candidate target cells.

The CHO status report configuration information may include one or more among a flag, reporting scheme information, and beam information.

The flag may indicate whether transmission of a CHO status report message including information for determining a target cell to which the terminal is likely to be handed over is requested.

When the reporting scheme information indicates periodic transmission of information for determining a target cell to which the terminal is likely to be handed over, the CHO status report configuration information may include one or more among periodicity information, a transmission start time, and a beam information request indicator, the periodicity information may indicate a transmission periodicity of a CHO status report message, the transmission start time may indicate a transmission time of the CHO status report message, and the beam information request indicator may request transmission of handover probability information for each beam within a cell.

When the reporting scheme information indicates that information for determining a target cell to which the terminal is likely to be handed over is transmitted when a specific condition is satisfied, the CHO status report configuration information may include one or more among a specific event condition, a threshold, a prohibition timer, and a beam information request indicator, the specific event condition may indicate either a CHO execution probability or a CHO status reporting event, the threshold may be a reference value satisfying the specific event condition for transmission of a CHO status report message, the prohibition timer may indicate a time for which transmission of a CHO status report message is prohibited, and the beam information request indicator may request transmission of handover probability information for each beam within a cell.

CHO configuration information may be included in the RRC reconfiguration message together with the CHO status report configuration information.

The operation method may further comprise: receiving, from the terminal, a CHO status report message including information for determining a target cell to which the terminal is likely to be handed over; determining the target cell to which the terminal is likely to be handed over based on information included in the CHO status report message; and transmitting a CHO status message to the target cell to which the terminal is likely to be handed over.

The operation method may further comprise performing data forwarding to the target cell to which the terminal is likely to be handed over after transmitting the CHO status message to the target cell to which the terminal is likely to be handed over.

According to another exemplary embodiment of the present disclosure for achieving the above-described objective, an operation method of a terminal may comprise: performing a monitoring operation of a conditional handover (CHO) preparation event; transmitting a measurement report message to a base station when the CHO preparation event is detected; receiving, from the base station, an RRC reconfiguration message including CHO status report configuration information requesting transmission of information for determining a target cell to which the terminal is likely to be handed over among one or more candidate target cells; and transmitting a CHO status report message according to the CHO status report configuration information.

The CHO status report configuration information may include one or more among a flag, reporting scheme information, and beam information.

The flag may indicate whether transmission of a CHO status report message including information for determining a target cell to which the terminal is likely to be handed over is requested.

When the reporting scheme information indicates periodic transmission of information for determining a target cell to which the terminal is likely to be handed over, the CHO status report configuration information may include one or more among periodicity information, a transmission start time, and a beam information request indicator, the periodicity information may indicate a transmission periodicity of a CHO status report message, the transmission start time may indicate a transmission time of the CHO status report message, and the beam information request indicator may request transmission of handover probability information for each beam within a cell.

When the reporting scheme information indicates that information for determining a target cell to which the terminal is likely to be handed over is transmitted when a specific condition is satisfied, the CHO status report configuration information may include one or more among a specific event condition, a threshold, a prohibition timer, and a beam information request indicator, the specific event condition may indicate either a CHO execution probability or a CHO status reporting event, the threshold may be a reference value satisfying the specific event condition for transmission of a CHO status report message, the prohibition timer may indicate a time for which transmission of a CHO status report message is prohibited, and the beam information request indicator may request transmission of handover probability information for each beam within a cell.

The operation method may further comprise performing a synchronization procedure with the target cell when a CHO execution event for the target cell indicated by the CHO status report message occurs.

The operation method may further comprise performing a cell selection procedure when a radio link failure (RLF) occurs.

When a cell selected by the cell selection procedure is the target cell, a handover procedure to the target cell may be performed, and when the cell selected by the cell selection procedure is not the target cell, a re-establishment procedure may be performed.

According to yet another exemplary embodiment of the present disclosure for achieving the above-described objective, a terminal may comprise a processor; a memory electronically communicating with the processor; and instructions stored in the memory, wherein when executed by the processor, the instructions cause the terminal to: perform a monitoring operation of a conditional handover (CHO) preparation event; transmit a measurement report message to a base station when the CHO preparation event is detected; receive, from the base station, an RRC reconfiguration message including CHO status report configuration information requesting transmission of information for determining a target cell to which the terminal is likely to be handed over among one or more candidate target cells; and transmit a CHO status report message according to the CHO status report configuration information.

The instructions may further cause the terminal to perform a synchronization procedure with the target cell when a CHO execution event for the target cell indicated by the CHO status report message occurs.

The instructions may further cause the terminal to perform a cell selection procedure when a radio link failure (RLF) occurs.

When a cell selected by the cell selection procedure is the target cell, a handover procedure to the target cell may be performed, and when the cell selected by the cell selection procedure is not the target cell, a re-establishment procedure may be performed.

According to the exemplary embodiments of the present disclosure, when a handover probability is equal to or greater than a certain level, the terminal to which a conditional handover is configured may inform a source cell that the handover probability is equal to or greater than the certain level, and the source cell may indicate a target cell to make resource reservation for the terminal. In addition, the source cell may forward data to be transmitted to the terminal to the target cell in advance, thereby minimizing a handover interruption time to enhance a communication quality without wasting system hardware resources of the base stations and capacity of interface links between the base stations.

DETAILED DESCRIPTION OF THE EMBODIMENTS

Figure 1:
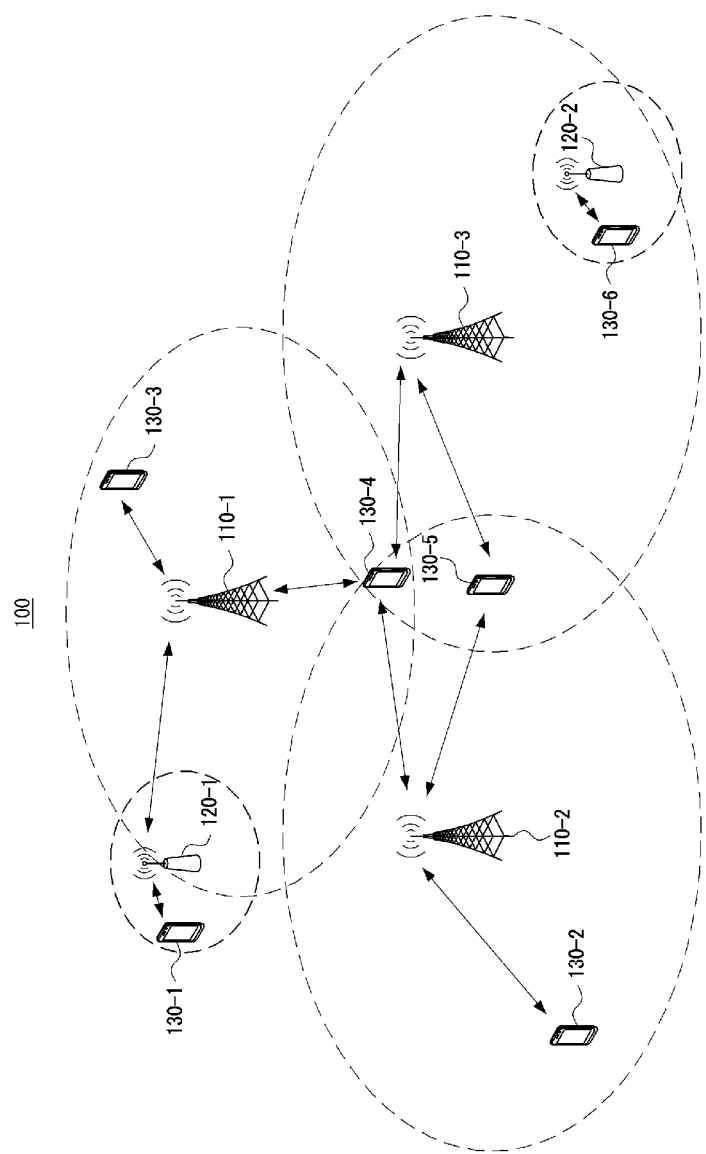
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
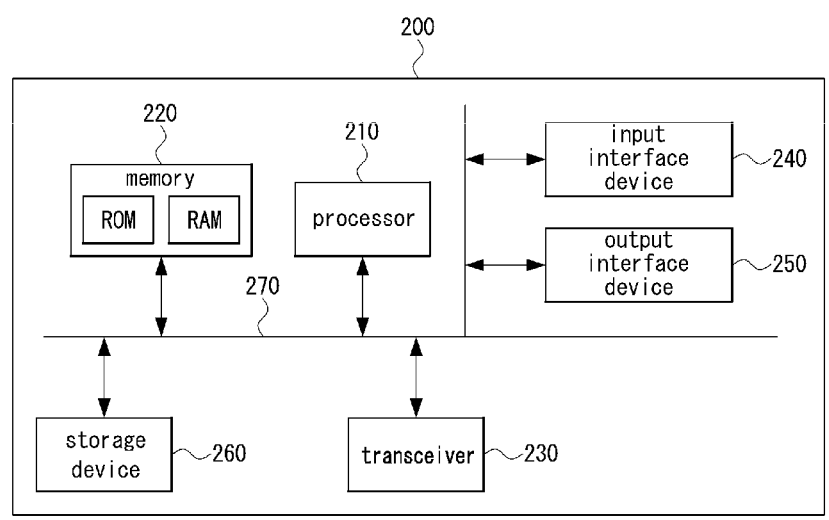
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, evolved Node-B (eNB), base transceiver station (BTS), radio base station, radio transceiver, access point, access node, road side unit (RSU), radio remote head (RRH), transmission point (TP), transmission and reception point (TRP), eNB, gNB, or the like.

Here, each of the plurality of terminals 130-1, 130-2, 130-3, 130-4, 130-5, and 130-6 may refer to a user equipment (UE), terminal, access terminal, mobile terminal, station, subscriber station, mobile station, portable subscriber station, node, device, Internet of things (IoT) device, mounted apparatus (e.g., a mounted module/device/terminal or an on-board device/terminal, etc.), or the like.

Hereinafter, enhanced handover methods will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

In exemplary embodiments, a source cell (e.g., serving cell) may refer to a source base station (e.g., serving base station), a neighbor cell may refer to a neighbor base station, and a target cell may refer to a target base station.

Figure 3:
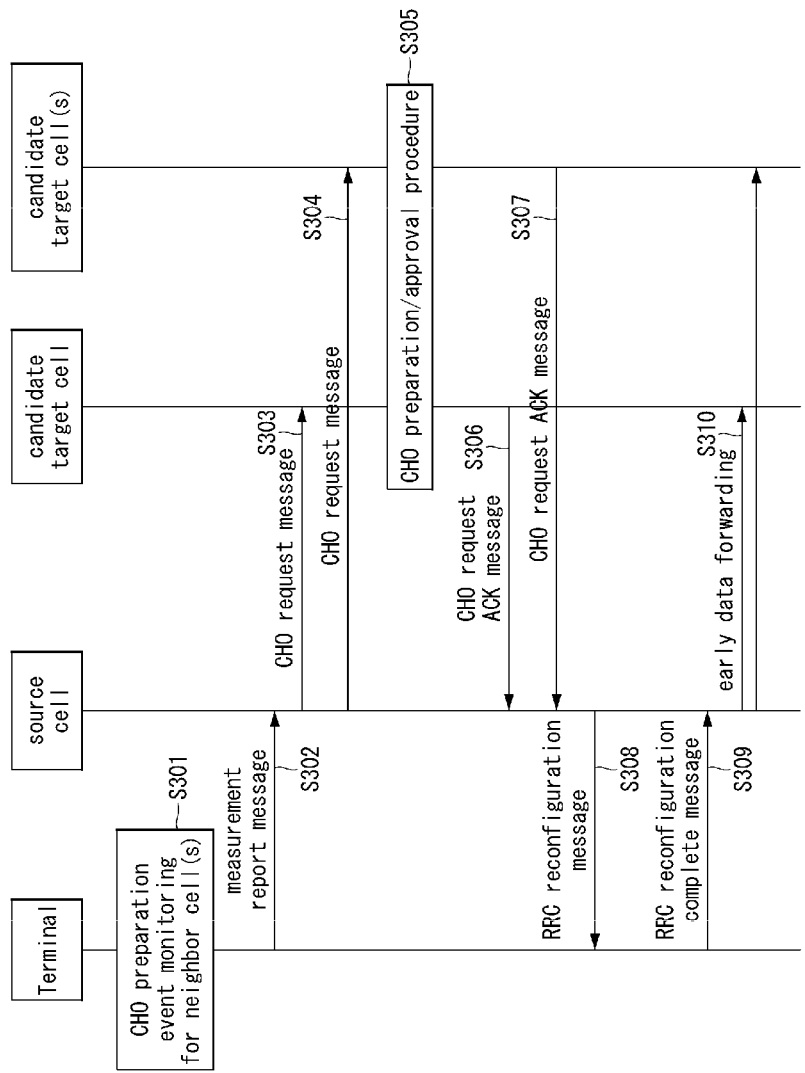
FIG. 3 is a sequence chart illustrating an exemplary embodiment of a conditional handover (CHO) method in a communication system.

FIG. 3 is a sequence chart illustrating an exemplary embodiment of a conditional handover (CHO) method in a communication system.

Referring to FIG. 3, a terminal may perform a CHO preparation event monitoring operation (S301). Configuration information for the CHO preparation event monitoring operation may be configured by a source cell. When a CHO preparation event is detected, the terminal may transmit a measurement report message to the source cell (S302). The source cell may receive the measurement report message from the terminal. The source cell may transmit a CHO request message to a candidate target cell (S303). In addition, the source cell may transmit a CHO request message to other candidate target cells (S304). The candidate target cell(s), which are transmission target(s) of the CHO request message, may be determined based on the measurement report message received from the terminal.

Upon receiving the CHO request message from the source cell, each of the candidate target cell(s) may perform a CHO preparation/approval procedure (S305), and may transmit a CHO request acknowledgement (ACK) message to the source cell (S306, S307). The source cell may receive the CHO request ACK message from the candidate target cell(s). The source cell may transmit a radio resource control (RRC) reconfiguration message to the terminal (S308). Upon receiving the RRC reconfiguration message, the terminal may transmit an RRC reconfiguration complete message to the source cell (S309). The source cell receiving the RRC reconfiguration complete message from the terminal may perform early data forwarding to the candidate target cell(s) (S310).

When late data forwarding is applied after a handover execution is completed, the source cell may perform data forwarding after receiving notification that the terminal has completed access to the target cell for handover. In this case, there is no unnecessary data forwarding, but a handover interruption time may increase.

When the early data forwarding is applied, the source cell may perform data forwarding to the candidate target cell(s) before the terminal executes the handover. In this case, the handover interruption time may be reduced, but unnecessary data forwarding may be increased.

Figure 4A:
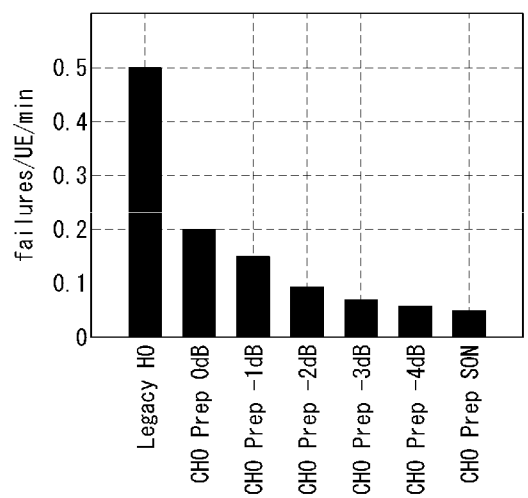
FIG. 4A is a graph describing a frequency of handover failures according to an offset of the event A3 in a preparation stage of a CHO procedure.
Figure 4B:
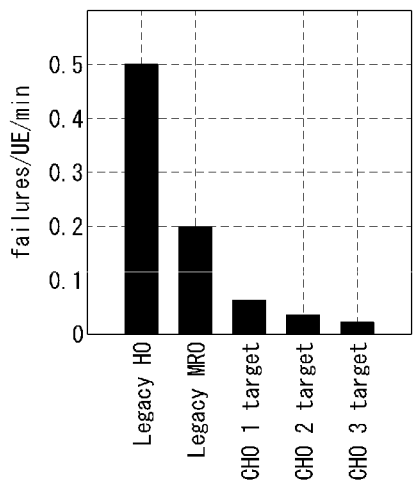
FIG. 4B is a graph describing a frequency of handover failures according to the number of candidate target cells.

FIG. 4A is a graph describing a frequency of handover failures according to an offset of the event A3 in a preparation stage of a CHO procedure, and FIG. 4B is a graph describing a frequency of handover failures according to the number of candidate target cells.

Referring to FIG. 4A, it can be seen that the frequency of handover failures decreases as the smaller offset of the CHO preparation event A3 is applied. In addition, referring to FIG. 4B, it can be seen that the frequency of handover failures decreases as the number of candidate target cells increases. Accordingly, more neighbor cells may be prepared as candidate target cells, thereby reducing the handover failure probability. However, since more neighbor cells are prepared as candidate target cells, there may be a problem that a signaling overhead increases and base station resources are wasted.

Figure 5:
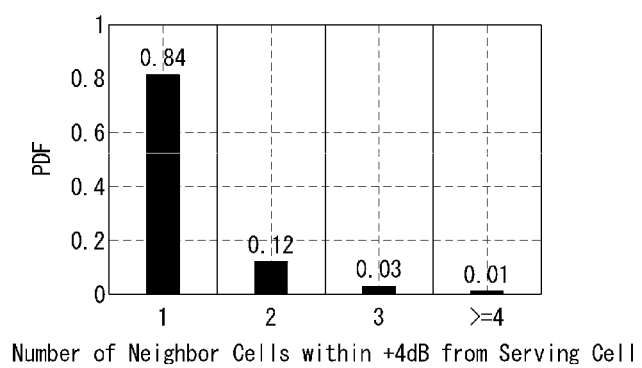
FIG. 5 is a graph describing a distribution of the number of neighbor cells having a signal strength of 4 dB or higher than that of a source cell in a communication system.

FIG. 5 is a graph describing a distribution of the number of neighbor cells having a signal strength of 4 dB or higher than that of a source cell in a communication system.

Referring to FIG. 5, it can be seen that cases where the number of neighbor cells having a signal strength of 4 dB or higher than that of a source cell is 2 or more occupy about 16%, which is quite a large number. Referring again to FIGS. 4A and 4B, by applying a smaller offset of the CHO preparation event A3 to prepare more neighbor cells as candidate target cells, the probability of handover failure may be lowered. However, the terminal executes handover to one of the candidate target cells, and other candidate target cells prepared for handover may unnecessarily waste resources.

Moreover, when early data forwarding is performed to reduce the handover interruption time, more data forwarding may be performed unnecessarily. In addition, since resources reserved in the candidate target cell(s) are no longer required, system resource efficiency may be degraded.

[Enhanced CHO Method]

Figure 6:
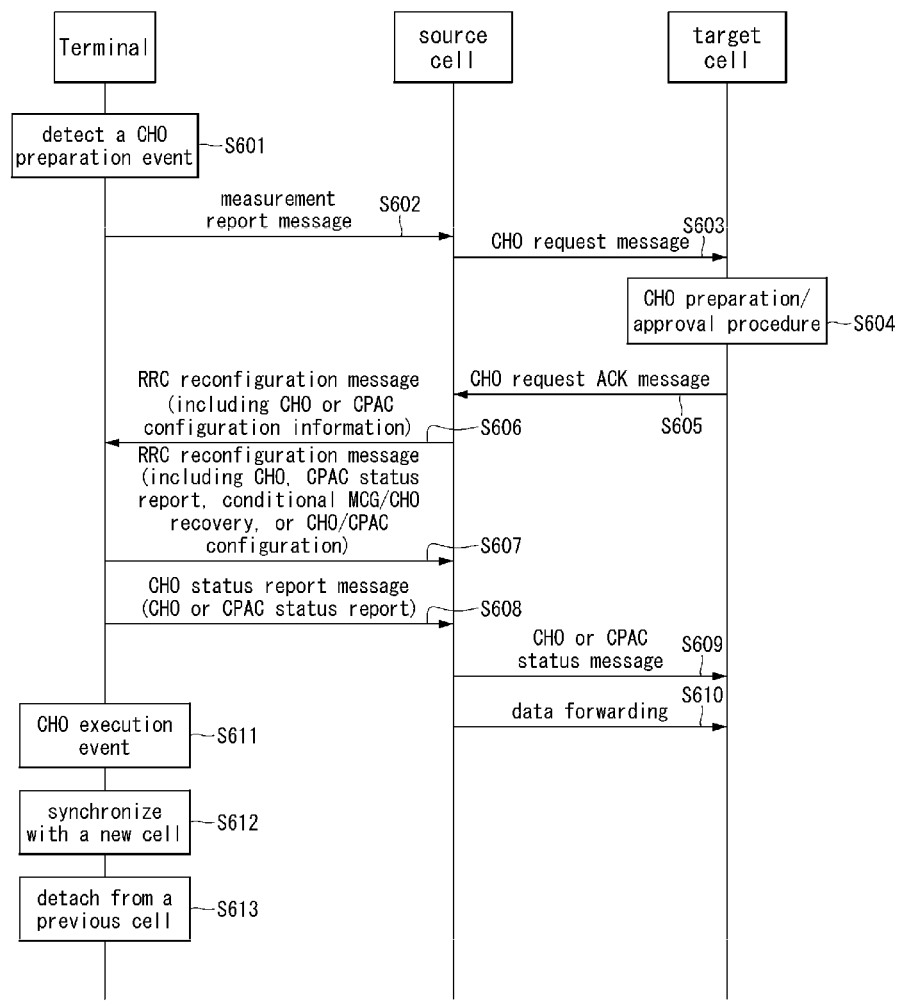
FIG. 6 is a sequence chart illustrating a first exemplary embodiment of an enhanced CHO method in a communication system.

FIG. 6 is a sequence chart illustrating a first exemplary embodiment of an enhanced CHO method in a communication system.

Referring to FIG. 6, a terminal may perform a CHO preparation event monitoring operation (S601). When a CHO preparation event is detected, the terminal may transmit a measurement report message to a source cell (S602). The source cell may receive the measurement report message from the terminal. The source cell may transmit a CHO request message to a candidate target cell (S603). Upon receiving the CHO request message from the source cell, the candidate target cell may proceed with a CHO preparation/approval procedure (S604), and may transmit a CHO request ACK message to the source cell (S605). The source cell may receive the CHO request ACK message from the candidate target cell. The source cell may transmit an RRC reconfiguration message including CHO configuration information to the terminal (S606).

Referring again to FIG. 3, in the conventional CHO procedure, the terminal receiving the RRC reconfiguration message from the source cell may transmit the RRC reconfiguration complete message to the source cell, and execute a handover when a handover execution condition of the CHO configuration information is satisfied. However, since the source cell does not receive any information from the terminal until the handover is completed, when performing early data forwarding, the source cell should perform data forwarding to all candidate target base stations prepared for handover.

Referring again to FIG. 6, in an enhanced CHO procedure, the source cell may generate CHO status report configuration information, and transmit an RRC reconfiguration message including the CHO status report configuration information to the terminal (S607). The CHO configuration information and the CHO status report configuration information may be included in the same RRC reconfiguration message. The terminal may receive the RRC reconfiguration message including the CHO configuration information and the CHO status report configuration information. The terminal may transmit a CHO status report message to the source cell periodically or when a specific condition is satisfied based on the CHO status report configuration information (S608).

For example, the terminal may transmit the CHO status report message to the source cell. The source cell receive the CHO status report message from the terminal, determine a target cell to which the terminal is likely to be handed over based on information included in the CHO status report message, and transmit a CHO status message to the determined target cell (S609). The CHO status message transmitted in the step S609 may include one or more pieces of information included in the CHO status report message transmitted in the step S608. In addition, the source cell may perform data forwarding to the target cell (S610).

Meanwhile, the terminal may monitor whether a CHO execution event occurs (S611). When a CHO execution event occurs, the terminal may acquire synchronization with a cell (e.g., target cell) in which the CHO execution event occurs (S612). Thereafter, a connection between the terminal and the previous cell (i.e., source cell) may be released (S613).

[Method of Delivering CHO Status Report Configuration Information to the Terminal]

In an operation method of the source cell according to a first exemplary embodiment for performing an enhanced CHO in the communication system, the source cell may transmit an RRC reconfiguration message including CHO status report configuration information to the terminal (S607). The CHO status report configuration information may be transmitted together with an RRC reconfiguration message including CHO configuration information or may be transmitted separately from the CHO configuration information. The CHO status report configuration information may include one or more among a flag, reporting scheme information, and beam information.

The flag may indicate whether the transmission operation of the CHO status report message is to be performed. For example, the flag set to a first value (e.g., 0) may indicate that the transmission operation of the CHO status report message is not to be performed. The flag set to a second value (e.g., 1) may indicate that the transmission operation of the CHO status report message is to be performed.

The reporting scheme information may indicate that a reporting scheme 1 or a reporting scheme 2 is used. When the reporting scheme 1 is used, CHO status reporting may be performed according to a preconfigured periodicity. When the reporting scheme 2 is used, the CHO status reporting may be performed when a specific event condition is satisfied.

When the reporting scheme 1 is used, the CHO status report configuration information may further include one or more pieces of information defined in Table 1 below.

TABLE 1

| Information | Description |
| --- | --- |
| Periodicity information | Transmission periodicity of the CHO status report message |
| Transmission start time | Transmission start time of the CHO status report message |
| Beam information request indicator | Beam information request indicator may request transmission of handover probability information for each beam within a cell. |

The periodicity information indicating how often the terminal reports the CHO status report message to the source cell may be configured. When necessary, a value indicating the transmission start time of the CHO status report message may be configured. When the transmission start time is configured, the CHO status report message may be periodically transmitted according to the configured periodicity information from the transmission start time.

When the beam information request indicator requests transmission of handover probability information for each beam within a cell, the terminal may transmit a CHO status report message including the handover probability information for each beam within the cell to the source cell. The CHO status report message may include handover probability information for all beams within the cell. The terminal may transmit a CHO status report message to the source cell including information on a beam having a handover probability equal to or greater than a specific threshold. Alternatively, the terminal may transmit a CHO status report message including information on a beam having the best received signal strength among the beams or information on n beams having a good received signal strength among the beams to the source cell. n may be a natural number.

When the reporting scheme 2 is used, the CHO status report configuration information may further include one or more pieces of information defined in Table 2 below.

TABLE 2

| Information | Description |
| --- | --- |
| Specific event condition | CHO execution probability or CHO status reporting event |
| Threshold | A reference value for satisfying a specific event condition |
| Prohibition timer | Time for which transmission of the CHO status report message is prohibited |
| Beam information request indicator | Beam information request indicator may request transmission of handover probability information for each beam within a cell. |

When a specific event condition is satisfied for a candidate target cell, it may be configured to transmit a CHO status report message for the corresponding candidate target cell. When a CHO execution probability for the candidate target cell is greater than or equal to the threshold, the terminal may transmit a CHO status report message to the source cell. When a CHO status reporting event for the candidate target cell is greater than or equal to a threshold, the terminal may transmit a CHO status report message to the source cell. The threshold for the CHO status reporting event may be configured to be lower than the threshold of the CHO execution condition included in the CHO configuration information. Alternatively, the terminal may directly determine the threshold for the CHO execution probability, and may transmit a CHO status report message to the source cell based on the determined threshold. In addition, a prohibit timer value may be set so as not to transmit a CHO status report message for a configured time.

The terminal may transmit, to the source cell, a CHO status report message for a target cell that satisfies the above-described conditions (e.g., CHO execution probability or CHO status reporting event). The CHO status report message may include information on the target cell that satisfies the above-described condition. The terminal may transmit a CHO status report message including information (e.g., CHO execution probability or CHO status reporting event) on all candidate target cells to which CHO is configured to the source cell. Alternatively, when configured to perform reporting only for candidate target cells having a CHO execution probability equal to or greater than a specific threshold, the terminal may perform reporting only for the candidate target cells that satisfy the corresponding condition.

[CHO Status Reporting Method]

The terminal may receive the RRC reconfiguration message including the CHO status report configuration information, and according to a reporting scheme indicated by the CHO status report configuration information received from the source cell, the terminal may transmit a CHO status report message to the source cell periodically or when a specific condition is satisfied (S608). When the flag for transmitting a CHO status report is set in the CHO status report configuration information, the terminal may transmit a CHO status report message to the source cell.

When the CHO status report message is configured to be transmitted periodically (e.g., when the reporting scheme 1 is used), the terminal may periodically transmit the CHO status report message to the source cell. The CHO status report message may be transmitted periodically according to a periodicity or a timer indicated by the CHO status report configuration information. In addition, when the prohibition timer value for the CHO status reporting is configured, the terminal may start the prohibition timer after transmitting the CHO status report message to the source cell, and may not transmit other CHO status report messages until the prohibition timer expires.

When the CHO status report message is configured to be transmitted when a specific condition (e.g., specific event) is satisfied (e.g., when the reporting scheme 2 is used), the terminal may transmit the CHO status report message to the source cell when a specific event condition is satisfied for a candidate target cell. When a CHO execution probability for a candidate target cell is greater than or equal to a specific threshold, the terminal may transmit a CHO status report message for the corresponding candidate target cell to the source cell. Alternatively, when a CHO status reporting event for a candidate target cell is greater than or equal to a specific threshold, the terminal may transmit a CHO status report message for the corresponding candidate target cell to the source cell.

The CHO status report message transmitted by the terminal to the source cell according to the scheme indicated by the source cell in the CHO status report configuration information may include one or more pieces of information described in Table 3 below.

TABLE 3

| Information | Description |
| --- | --- |
| Information on target cells | Information on whether a specific event scheme, CHO execution |

TABLE 3-continued

| Information | Description |
| --- | --- |
|  | probability, or CHO status reporting event is satisfied. |
| Information on beams within a cell | Information on handover probability information for each beam within a cell |
| Identification information of a candidate target cell | Information indicating a candidate target cell satisfying a specific event and/or a specific condition |

According to the information on target cells, which is included in the CHO status report message, a target cell to which the terminal is likely to be handed over may be determined among candidate target cells that satisfy a specific event scheme, CHO execution probability, or CHO status reporting event.

The terminal may transmit a CHO status report message including handover probability information for each beam (e.g., handover probability information for each beam within the cell) to the source cell. The terminal may transmit a CHO status report message including beam information of a candidate target cell having a handover probability equal to or greater than a threshold to the source cell. The terminal may transmit, to the source cell, a CHO status report message including information on a beam having the best received signal strength among beams or information on n beams having a good received signal strength among beams. n may be a natural number.

When the source cell configures the terminal to transmit a CHO status report message for a candidate target cell that satisfies the above-described specific condition, the terminal may transmit a CHO status report message for a candidate target cell that satisfies the above-described specific condition to the source cell. When the source cell configures the terminal to transmit CHO status report messages for all candidate target cells, the terminal may transmit CHO status report messages for all CHO candidate target cells to the source cell. Alternatively, when the source cell configures the terminal to transmit a CHO status report message for a candidate target cell having a handover execution probability equal to or greater than a specific threshold, the terminal may transmit a CHO status report message for a candidate target cell that satisfies the corresponding condition.

Meanwhile, the source cell may receive the CHO status report message from the terminal (S608). The source cell receiving the CHO status report message from the terminal may identify the information included in the CHO status report message, and may transmit a CHO status message to the target cell (e.g., candidate target cell) based on the identified information (S609). For example, based on the information included in the CHO status report message, the source cell may identify a candidate target cell that satisfies a specific event, a candidate target cell having a CHO execution probability equal to or greater than a threshold, or a candidate target cell satisfying a CHO status reporting event equal to or greater than a threshold, and may transmit a CHO status message to the identified candidate target cell.

The CHO status message transmitted from the source cell to the target cell may include information indicating the target cell to which the terminal is likely to be handed over (e.g., the identifier of the target cell, information on a beam within the target cell) and/or information of the corresponding terminal. The CHO status message may trigger a resource reservation operation for the terminal in the target cell to which the terminal is likely to be handed over. The information included in the CHO status message transmitted in the step S609 may be different from the information included in the CHO status report message transmitted in the step S608. The target cell may receive the CHO status message from the source cell, and may identify the information included in the CHO status message. For example, the target cell may confirm that itself is a final target cell to which the terminal is likely to be handed over based on the information included in the CHO status message. In addition, the target cell may identify information on a beam to be used for communication with the terminal based on the CHO status message.

The source cell may perform an early data forwarding operation to reduce a handover interruption time to transmit data for the terminal to the target cell (e.g., the final target cell to which the terminal is likely to be handed over) before the terminal attempts access to the target cell (S610). The target cell may receive the data for the terminal from the source cell. When a CHO execution event for the target cell occurs, the terminal may perform a synchronization procedure with the target cell, and may perform a detach procedure with the source cell. When a connection between the target cell and the terminal is established, the target cell may transmit the data received from the source cell to the terminal.

[Enhanced Conditional Cell Addition/Change Method]

The base station may request a CPAC status report from the terminal supporting conditional PSCell addition/change (CPAC). Referring again to FIG. 6, in the procedure described above, a CPAC procedure may be performed using CPAC status report configuration information and a CPAC status report message. Accordingly, the source cell may transmit an RRC reconfiguration message including CPAC configuration information to the terminal.

In addition, the source cell may transmit an RRC reconfiguration message including the CPAC status report configuration information to the terminal (S607). The CPAC configuration and the CPAC status report configuration information may be transmitted through the same RRC reconfiguration message or different RRC reconfiguration messages.

The CPAC status report configuration information may include a flag, reporting scheme (e.g., periodicity configuration information, event scheme (condition)), and/or beam information. In addition, the CPAC status report configuration information may further include one or more pieces of the information described in Tables 1 to 3.

In addition, the CPAC status report message may further include one or more pieces of information described in Table 4.

TABLE 4

| Information | Description |
| --- | --- |
| Information on target cells | Information on a target cell(s) satisfying a CPAC execution probability or CPAC status reporting event |
| SCell (secondary cell) information | Information on received signal strengths of SCell(s) within a target cell |

In another exemplary embodiment, the source cell may transmit an RRC reconfiguration message including CHO/CPAC configuration information to the terminal, so that CHO and CPAC are configured at the same time (S607). The source cell may configure the terminal not to execute CPAC when a specific condition is satisfied. The source cell may transmit the CHO and CPAC configuration information, and in a state in which the CPAC is configured, the terminal may stop CPAC evaluation when a configured specific condition is satisfied. When CHO execution is imminent, it may be for the terminal to efficiently control the execution of CHO and CPAC so as not to execute unnecessary CPAC.

The specific condition for stopping CPAC evaluation for CPAC may be a case when a reference signal received power (RSRP), reference signal received quality (RSRQ), and/or signal to interference plus noise ratio (SNRP) of a candidate target cell is greater than or equal to a preconfigured reference, a case when a RSRP of a candidate target cell is greater than a RSRP of a master cell group (MCG) PCell by an offset or more, a case when a RSRQ of a candidate target cell is greater than a RSRQ of a MCG PCell by an offset or more, or a case when a SINR of a candidate target cell is greater than a SINR of a MCG PCell by an offset or more.

[Method for MCG Failure Recovery in a Terminal in which DC is Configured]

Figure 7:
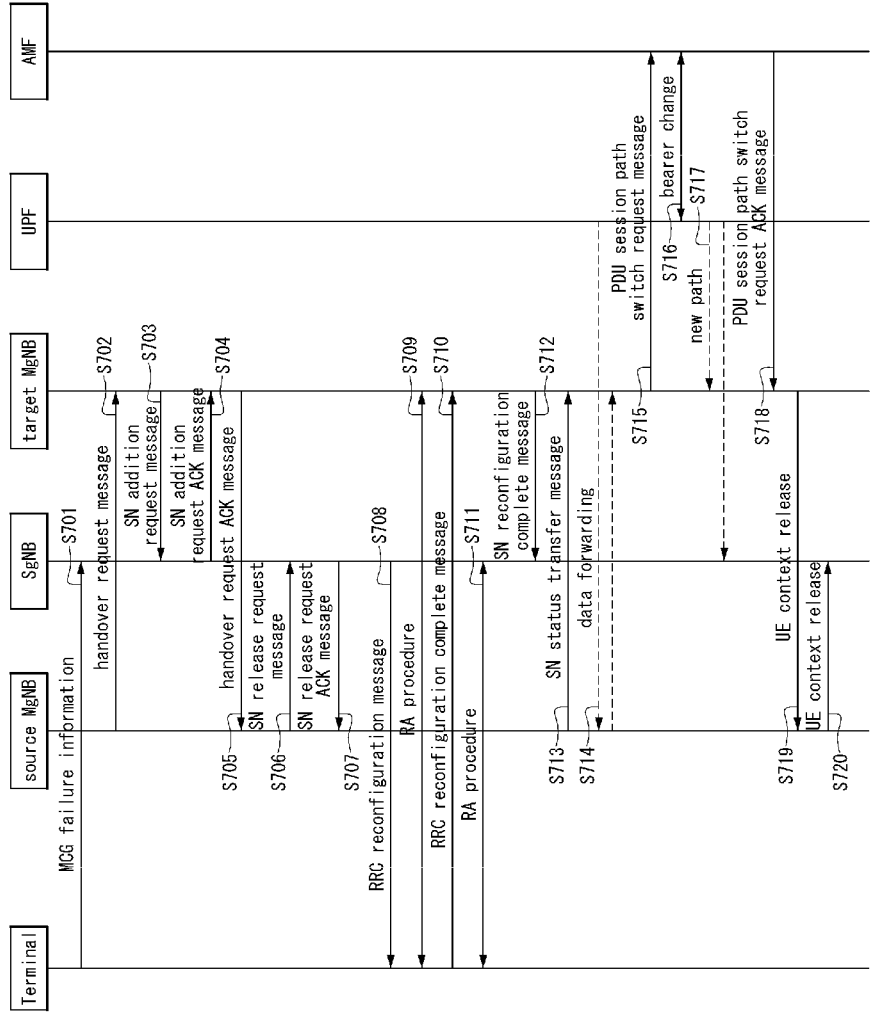
FIG. 7 is a sequence chart illustrating a MCG failure recovery method for a terminal in which dual connectivity (DC) is configured.

FIG. 7 is a sequence chart illustrating a MCG failure recovery method for a terminal in which dual connectivity (DC) is configured.

Referring to FIG. 7, a MCG recovery procedure may be performed when an MCG radio link failure (RLF) occurs. In this case, the terminal may report MCG failure information to a secondary gNB (SgNB) through a secondary cell group (SCG) (S701). The SgNB may receive the MCG failure information from the terminal.

A source master gNB (MgNB) may transmit a handover request message to a candidate target MgNB (S702). The candidate target MgNB may receive the handover request message from the source MgNB. The candidate target MgNB may transmit a secondary node (SN) addition request message to the SgNB (S703). Upon receiving the SN addition request message from the candidate target MgNB, the SgNB may transmit an SN addition request ACK message to the candidate target MgNB (S704). The candidate target MgNB may receive the SN addition request ACK message from the SgNB.

The candidate target MgNB may transmit a handover request ACK message to the source MgNB (S705). The source MgNB may receive the handover request ACK message from the SgNB. The source MgNB may transmit an SN release request message to the SgNB (S706). Upon receiving the SN release request message from the source MgNB, the SgNB may transmit an SN release request ACK message to the source MgNB (S707). The source MgNB may receive the SN release request ACK message from the SgNB.

The SgNB may transmit an RRC reconfiguration message to the terminal (S708). The terminal may receive the RRC reconfiguration message from the SgNB. In addition, a random access (RA) procedure may be performed between the terminal and the target MgNB (S709). When a connection establishment between the terminal and the target MgNB is completed, the terminal may transmit an RRC reconfiguration complete message to the target MgNB (S710). The target MgNB may receive the RRC reconfiguration complete message from the terminal. An RA procedure may be performed between the terminal and the SgNB (S711).

When a connection establishment between the terminal and the SgNB is completed, the target MgNB may transmit an SN reconfiguration complete message to the SgNB (S712). The SgNB may receive the SN reconfiguration complete message from the target MgNB. The source MgNB may transmit an SN status transfer message to the target MgNB (S713). The target MgNB may receive the SN status transfer message from the source MgNB.

A user plane function (UPF) may perform data forwarding to the source MgNB. In addition, the source MgNB may perform data forwarding to the target MgNB (S714). Upon receiving data from the source MgNB, the target MgNB may transmit a protocol data unit (PDU) session path switch request message to an access and mobility management function (AMF) (S715). The AMF may receive the PDU session path switch request message from the target MgNB. The AMF may transmit a bearer change message to the UPF (S716). The UPF may receive the bearer change message from the AMF.

The UPF may transmit a new path configuration message to the target MgNB and SgNB (S717). The target MgNB and SgNB may receive the new path configuration message from the UPF. The AMF may transmit a PDU session path switch request ACK message to the target MgNB (S718). The target MgNB may receive the PDU session path switch request ACK message from the AMF. Upon receiving the PDU session path switch request ACK message, the target MgNB may request a UE context release from the source MgNB (S719). In addition, the source MgNB may request the SgNB to release UE context (S720).

In addition, when an RLF occurs, a cell selection procedure may be performed for CHO recovery. A CHO procedure may be performed when a selected cell is a candidate target cell in which CHO is configured, and a re-establishment procedure may be performed when the selected cell is not a candidate target cell in which CHO is configured. Accordingly, the CHO procedure or the re-establishment procedure may be selectively performed depending on whether the selected cell is a candidate target cell in which CHO is configured.

Referring again to FIG. 6, when a terminal supports the MCG failure and CHO recovery procedures simultaneously, the source cell may transmit an RRC reconfiguration message including conditional MCG/CHO recovery procedure configuration information to the terminal (S607). The terminal may be configured to perform an MCG recovery procedure when a specific condition included in the conditional MCG/CHO recovery procedure configuration information is satisfied. The source cell may configure a conditional fast MCG recovery procedure. When an RLF occurs, the terminal may perform an MCG recovery procedure when a configured specific condition is satisfied. When the specific condition is not satisfied, the terminal may perform a CHO recovery procedure.

In another exemplary embodiment, the source cell may configure the terminal to perform a CHO recovery procedure when a specific condition is satisfied. In this case, when an RLF occurs, the terminal may perform a CHO recovery procedure when a configured specific condition is satisfied. When the specific condition is not satisfied, the terminal may perform an MCG recovery procedure.

The specific condition for executing the conditional fast MCG recovery procedure may be a case when an RSRP, RSRQ, and/or SINR of a SCG cell is greater than or equal to a preconfigured reference, a case when the RSRP of the SCG cell is greater than the RSRP of the candidate target cell by an offset or more, a case when the RSRQ of the SCG cell is greater than the RSRQ of the candidate target cell by an offset or more, a case when the SINR of the SCG cell is greater than the SINR of the candidate target cell by an offset or more, or a case when the RSRP, RSRQ, and/or SINR of the candidate target cell is less than or equal to a preconfigured reference.

The specific condition for the execution of the CHO recovery procedure may be a case when the RSRP, RSRQ, and/or SINR of the candidate target cell is greater than or equal to a preconfigured reference, a case when the RSRP of the candidate target cell is greater than the RSRP of the SCG cell by an offset or more, a case when the RSRQ of the candidate target cell is greater than the RSRQ of the SCG cell by an offset or more, a case when the SINR of the candidate target cell is greater than the SINR of the SCG cell by an offset or more, or a case when the RSRP, RSRQ, and/or SINR of the SCG cell is less than or equal to a preconfigured reference.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a base station in a communication system, the operation method comprising:
 receiving a measurement report message from a terminal;
 transmitting a conditional handover (CHO) request message to one or more candidate target cells;
 receiving a CHO request acknowledgement (ACK) message from the one or more candidate target cells; and
 transmitting a radio resource control (RRC) reconfiguration message including CHO status report configuration information to the terminal,
 wherein the CHO status report configuration information includes a flag, and
 wherein the flag indicates whether transmission of a CHO status report message including information for determining a target cell to which the terminal is likely to be handed over is requested.

2. The operation method according to claim 1, wherein the CHO status report configuration information further includes one or more among reporting scheme information, and beam information.

3. The operation method according to claim 2, wherein when the reporting scheme information indicates periodic transmission of information for determining a target cell to which the terminal is likely to be handed over,
 the CHO status report configuration information includes one or more among periodicity information, a transmission start time, and a beam information request indicator,
 the periodicity information indicates a transmission periodicity of a CHO status report message, the transmission start time indicates a transmission time of the CHO status report message, and the beam information request indicator requests transmission of handover probability information for each beam within a cell.

4. The operation method according to claim 2, wherein when the reporting scheme information indicates that information for determining a target cell to which the terminal is likely to be handed over is transmitted when a specific condition is satisfied,
 the CHO status report configuration information includes one or more among a specific event condition, a threshold, a prohibition timer, and a beam information request indicator,
 the specific event condition indicates either a CHO execution probability or a CHO status reporting event, the threshold is a reference value satisfying the specific event condition for transmission of a CHO status report message, the prohibition timer indicates a time for which transmission of a CHO status report message is prohibited, and the beam information request indicator requests transmission of handover probability information for each beam within a cell.

5. The operation method according to claim 1, wherein CHO configuration information is included in the RRC reconfiguration message together with the CHO status report configuration information.

6. The operation method according to claim 1, further comprising:
 receiving, from the terminal, a CHO status report message including information for determining a target cell to which the terminal is likely to be handed over;
 determining the target cell to which the terminal is likely to be handed over based on information included in the CHO status report message; and
 transmitting a CHO status message to the target cell to which the terminal is likely to be handed over.

7. The operation method according to claim 6, further comprising performing data forwarding to the target cell to which the terminal is likely to be handed over after transmitting the CHO status message to the target cell to which the terminal is likely to be handed over.

8. An operation method of a terminal in a communication system, the operation method comprising:
 performing a monitoring operation of a conditional handover (CHO) preparation event;
 transmitting a measurement report message to a base station when the CHO preparation event is detected;
 receiving, from the base station, an RRC reconfiguration message including CHO status report configuration information requesting transmission of information for determining a target cell to which the terminal is likely to be handed over among one or more candidate target cells; and
 transmitting a CHO status report message according to the CHO status report configuration information.

9. The operation method according to claim 8, wherein the CHO status report configuration information includes one or more among a flag, reporting scheme information, and beam information.

10. The operation method according to claim 9, wherein the flag indicates whether transmission of a CHO status report message including information for determining a target cell to which the terminal is likely to be handed over is requested.

11. The operation method according to claim 9, wherein when the reporting scheme information indicates periodic transmission of information for determining a target cell to which the terminal is likely to be handed over,
- the CHO status report configuration information includes one or more among periodicity information, a transmission start time, and a beam information request indicator,
- the periodicity information indicates a transmission periodicity of a CHO status report message, the transmission start time indicates a transmission time of the CHO status report message, and the beam information request indicator requests transmission of handover probability information for each beam within a cell.

12. The operation method according to claim 9, wherein when the reporting scheme information indicates that information for determining a target cell to which the terminal is likely to be handed over is transmitted when a specific condition is satisfied,
- the CHO status report configuration information includes one or more among a specific event condition, a threshold, a prohibition timer, and a beam information request indicator,
- the specific event condition indicates either a CHO execution probability or a CHO status reporting event, the threshold is a reference value satisfying the specific event condition for transmission of a CHO status report message, the prohibition timer indicates a time for which transmission of a CHO status report message is prohibited, and the beam information request indicator requests transmission of handover probability information for each beam within a cell.

13. The operation method according to claim 8, further comprising performing a synchronization procedure with the target cell when a CHO execution event for the target cell indicated by the CHO status report message occurs.

14. The operation method according to claim 8, further comprising performing a cell selection procedure when a radio link failure (RLF) occurs.

15. The operation method according to claim 14, wherein when a cell selected by the cell selection procedure is the target cell, a handover procedure to the target cell is performed, and when the cell selected by the cell selection procedure is not the target cell, a re-establishment procedure is performed.

16. A terminal comprising:
- a processor;
- a memory electronically communicating with the processor; and
- instructions stored in the memory,
- wherein when executed by the processor, the instructions cause the terminal to:
  - perform a monitoring operation of a conditional handover (CHO) preparation event;
  - transmit a measurement report message to a base station when the CHO preparation event is detected;
  - receive, from the base station, an RRC reconfiguration message including CHO status report configuration information requesting transmission of information for determining a target cell to which the terminal is likely to be handed over among one or more candidate target cells; and
  - transmit a CHO status report message according to the CHO status report configuration information.

17. The terminal according to claim 16, wherein the instructions further cause the terminal to perform a synchronization procedure with the target cell when a CHO execution event for the target cell indicated by the CHO status report message occurs.

18. The terminal according to claim 16, wherein the instructions further cause the terminal to perform a cell selection procedure when a radio link failure (RLF) occurs.

19. The terminal according to claim 18, wherein when a cell selected by the cell selection procedure is the target cell, a handover procedure to the target cell is performed, and when the cell selected by the cell selection procedure is not the target cell, a re-establishment procedure is performed.

* * * * *